United States Patent [19]

Dachowski et al.

[11] Patent Number: 4,463,442
[45] Date of Patent: Jul. 31, 1984

[54] EMULATION OF DATA PROCESSING DISPLAY TERMINALS OF VARIABLE SCREEN SIZE ON THE DISPLAY OF A TEXT PROCESSOR

[75] Inventors: Richard P. Dachowski, Round Rock; Patrick D. Motola, Austin, both of Tex.

[73] Assignee: International Business Machines Corporation, Armonk, N.Y.

[21] Appl. No.: 310,185

[22] Filed: Oct. 9, 1981

[51] Int. Cl.³ .............................................. G06F 3/14
[52] U.S. Cl. .................................................. 364/900
[58] Field of Search ... 364/200 MS File, 900 MS File

[56] References Cited

U.S. PATENT DOCUMENTS

| 3,786,429 | 1/1974 | Goldman et al. | |
| 4,195,353 | 3/1980 | Abe et al. | 364/900 |
| 4,198,685 | 4/1980 | Corwin et al. | 364/900 |
| 4,373,194 | 2/1983 | Demke et al. | 364/900 |
| 4,377,852 | 3/1973 | Thomson | 364/900 |
| 4,392,197 | 7/1983 | Couper et al. | 364/200 |

Primary Examiner—Jerry Smith
Assistant Examiner—Mark P. Watson

Attorney, Agent, or Firm—J. B. Kraft

[57] ABSTRACT

An improvement is provided to a text processor having an interactive display terminal. The improvement provides for a combination of said text processor with a data processor and means for conducting data processing sessions utilizing the data processor between text processing sessions carried out by said text processor. During such data processing sessions, the interactive display terminal of said text processor emulates a data processing terminal. The emulated display terminal is connected to the data processor whereby the emulated terminal functions as a display terminal for the data processor. Further, means are provided which are operational during the data processing session to define the outer dimensions of a limited area on the display terminal to correspond to the dimensions of the data processing display terminal screen being emulated.

In accordance with a more particular aspect of the disclosure, means are provided in the text processing system for storing data representative of the outlines of a plurality of different data processing display screen to be emulated together with means for selecting one of the plurality of stored outlines to be displayed on the emulated screen.

4 Claims, 5 Drawing Figures

EMULATION OF DATA PROCESSING DISPLAY TERMINALS OF VARIABLE SCREEN SIZE ON THE DISPLAY OF A TEXT PROCESSOR

DESCRIPTION

1. Technical Field

This invention relates to text processing systems, i.e., information processing systems wherein the processing affects the format of the information. It provides such text processing systems with a data processing capability, i.e., processing operations wherein the processing relates to the value of the information.

2. Background Art

In prior art information processing systems, there has traditionally been a dividing line between data processing systems and text or word processing systems. The older data processing field developed over the past forty years is directed to information processing the primary purpose of which is to affect the value of the information being processed. The processing involves mathematical and other computational operations such as ordering and sorting which affect the substance or value of the information. In general, data processing is not concerned with format of the information except to the extent necessary to make the information readable or discernible to the operator either through a display or a printout. Otherwise, form is of no consequence.

On the other hand, in the newer word processing or text processing field which has developed over the past ten years, the value or substance of the information is of little consequence. Text processing is concerned with the formatting of alphanumeric data into a format or arrangement suitable for specified printed documents which are to be read and discerned by the public, e.g., letters, textbooks, magazines and newspapers.

Because of these substantial differences in functions, text processing equipment has been in general developed and marketed independent of data processing technology. Most businesses which require both data processing and text processing are likely to have independent systems for each function.

In recent years there has been some information processing equipment available which purports to carry out both data processing and text processing operations. However, such systems involve a processor which upon the loading of operational programming will act as a data processor to the completion of any initiated data processing operations. Alternatively, upon the insertion and change of operational programming, the processor may be converted into a word or text processor and perform only text processing operations until their completion. Co-pending application entitled "A Text Processor Having an Interactive Display Terminal which Alternately Functions as a Data Processing Terminal," S. F. Clements et al, Ser. No. 310,184, filed on the same date as the present application and assigned to a common assignee provides an interactive system which is capable of switching from an initiated data processing session to a text processing session before the completion of the data processing session and then to switch back to the data processing session and resume the incomplete data processing operations at the point where the session was switched to text processing. The system in said co-pending application utilizes a text or word processor having an interactive display terminal for conducting said text processing operations and a data processor for conducting said data processing operations. The system further includes means activated during the data processing sessions for operating the text processor as an emulation of an interactive display terminal and means for connecting said emulated display terminal to the data processor so that the emulated display terminal functions as a display terminal for said data processor.

In order that a text processor have the capability of functioning as a display terminal for a plurality of data processors it is important for the display of the text processor to be able to emulate a variety of data processor displays so that the operator is in effect utilizing the display terminal as a selected data processing display terminal.

DISCLOSURE OF THE INVENTION

The system of the present invention provides its capability through the combination of the text processor having an interactive display terminal and a data processor. Text processor has means for conducting data processing sessions between text processing sessions. The present invention further includes means operational during data processing sessions to define selected outer dimensions of a limited area of the display terminal to correspond to the dimensions of the particular data processing display terminal screen being emulated. In other words, the system is capable of emulating a plurality of different data processing terminals. In emulating this plurality of different display terminals, the system has means for storing in the text processing system data representative of the outlines of a plurality of different data processing display screens to be emulated and a means for selecting one of the plurality of stored outlines to be displayed as the emulated screen.

BRIEF DESCRIPTION OF DRAWINGS

Referring now to the drawings, wherein a preferred embodiment of the invention is illustrated, and wherein like reference numerals are used throughout to designate like parts.

BEST MODE FOR CARRYING OUT THE INVENTION

Figure 1:
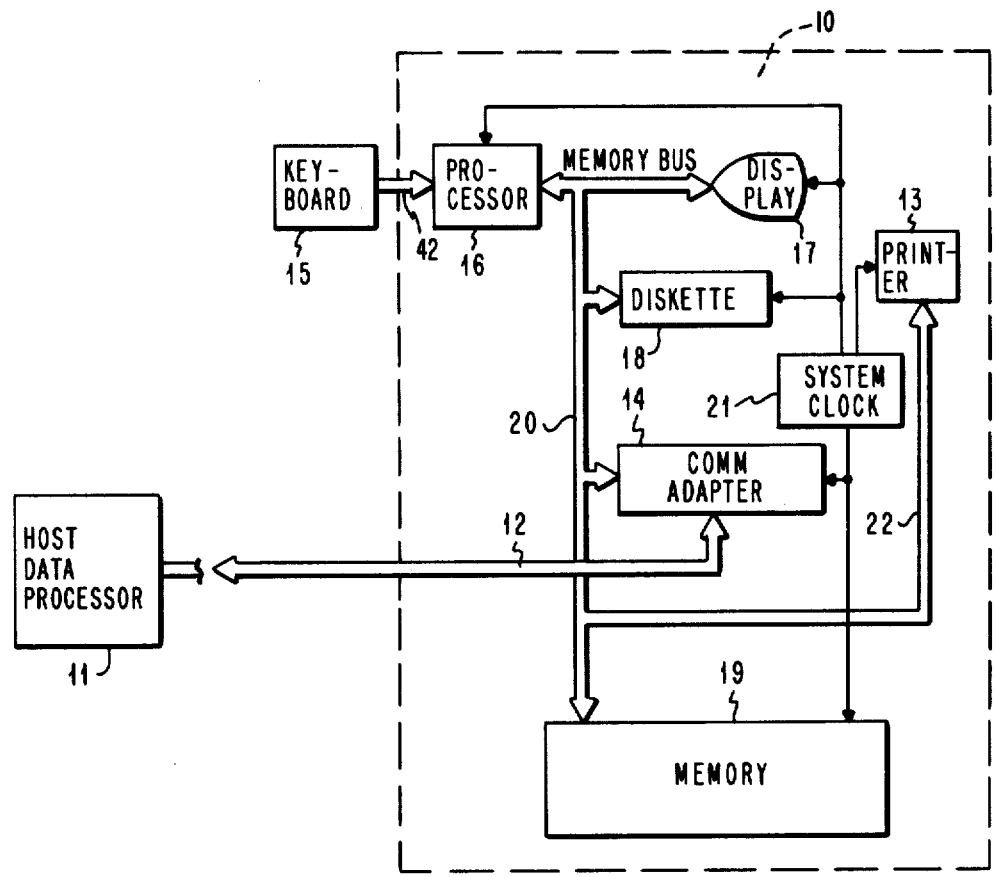
FIG. 1 is a logical block diagram showing the generalized form of the apparatus which may be used in the practice of the present invention.
Figure 2:
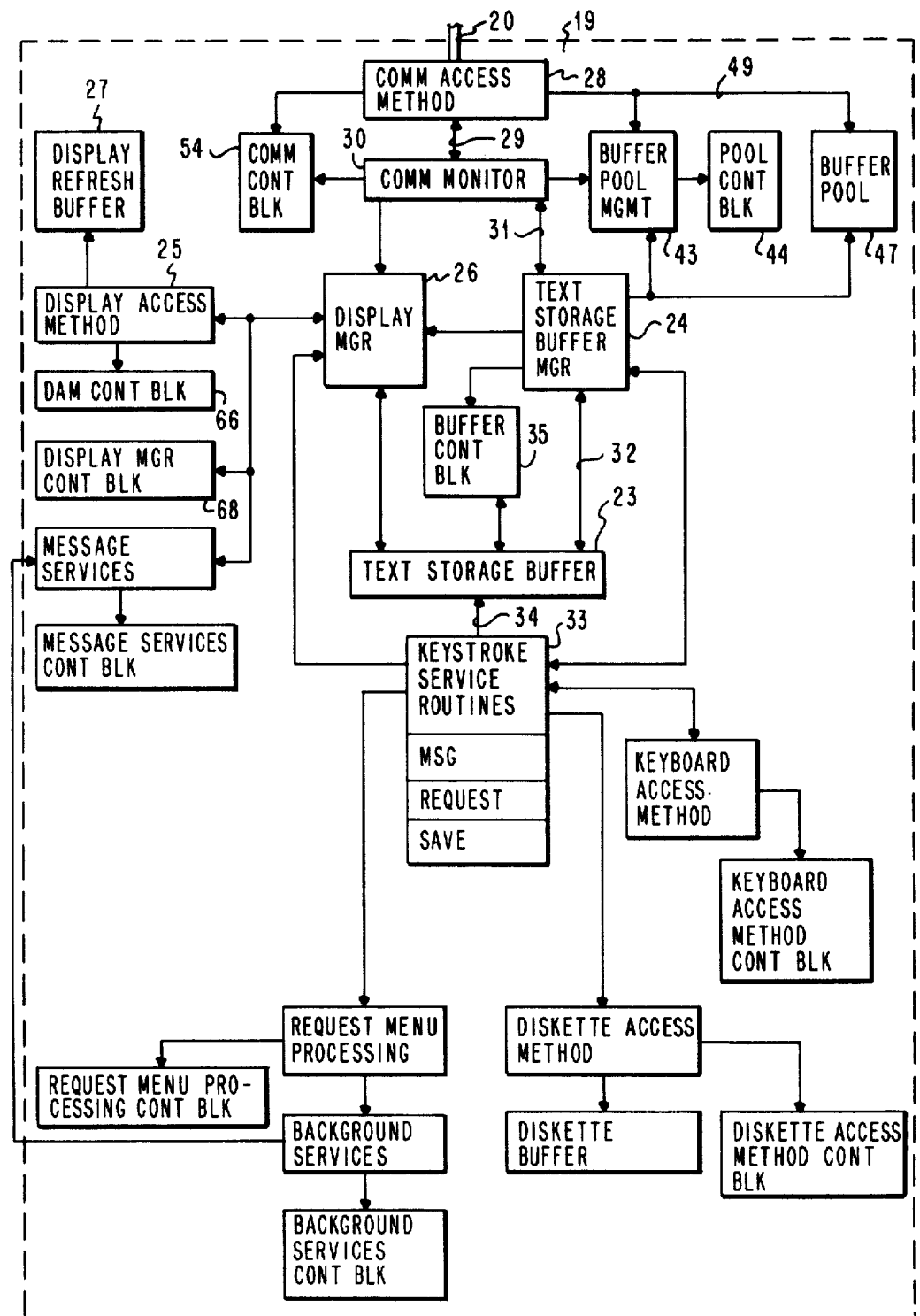
FIG. 2 is a logical block diagram showing the apparatus of the memory means in the text processor including a number of designated data areas and functional programs controlling the operation of the system involving the present invention.

In our description of the preferred embodiment for carrying out the present invention, we will utilize hardware which has already been described in the above-mentioned co-pending application, "A Text Processor Having an Interactive Display Terminal which Alternately Functions as a Data Processing Terminal," S. F. Clements et al. This hardware is shown in FIGS. 1 and 2. The system comprises a text processor 10 including a display 17. A host data processor 11 communicates with text processor 10 over bus 12. Text processor 10 includes a communications adapter 14 connected to bus 12. In text processor 10, the operator accesses the processor through operator control keys on keyboard 15. The keyboard drives a processor 16. The processor is operably connected into a visual display 17, a diskette 18, and a random access memory 19 through a memory bus 20. A system clock 21 is provided for timing functions within text processor 10. A printer 13 associated with text processor 10 is communicated with over bus 22. Memory 19 has the means for storing data and for controlling display 17 to display data or printer 13 to print data. Memory 19 includes a number of data areas and function programs for operating with the data input into it through bus 20 from communications adapter 14.

With reference to FIG. 2 which shows the elements of memory 19, many of which will be described hereinafter in greater detail, the data to be displayed is stored in text storage buffer 23. The handling and updating of data stored in text storage buffer 23 is controlled by routine stored within text storage buffer manager block 24.

The displaying of data stored in the text storage buffer 23 on display 17 of FIG. 1 may be done in any conventional manner. The data stored in text storage buffer 23 is sequential data representative of alphanumeric data. For convenience, such data may be referred to as text character data. In displaying the characters, text character data stored in buffer 23 is communicated to display access method 25 through display manager 26. The data from the display access method 25 is applied to display refresh buffer 27 which operates in the conventional manner referred to above to maintain alphanumeric text data representative of the stored data on visual display screen 17 (FIG. 1). It should be noted that display manager 26 serves to store flag and status information as required by the operation of display access method 25.

In accordance with the referenced Clements et al application, the system operates as a text processing system wherein the system operates under the control of a internal processor 16 which controls memory 19 shown in detail in FIG. 2 to perform various formatting operations utilizing display 17 and to produce documents on printer 13 in accordance with the operation covered in co-pending U.S. patent application Ser. No. 274,050, filed June 16, 1981, Dennis G. Busch, "Data Communications System with Receiving Terminal for Varying the Portions of Received Data Being Displayed". Also, system involves data processing sessions wherein the host data processor 11 communicates with memory 19 through bus 12 and communications adapter 14 which accesses memory 19 through bus 20. In such a data processing operation, the data from communications adapter enters memory 19 (FIG. 2) on bus 20 and is input into communications access method 28 after which the data is input over channel 29 to communications monitor 30. Information from communications monitor 30 is input over channel 31 to text storage buffer manager 24 and the data is input into the text storage buffer 23 over channel 32.

Since the operator controls the processes being described through a keyboard 15 communicating through a processor 16, standard keyboard entry processes should be generally described. As the operator enters each keystroke at the keyboard 15, a corresponding signal is transmitted through channel 42 to processor 16 which enters the keystroke command into memory 19. In the memory, upon the receipt of a keystroke command, a keystroke routine is called for keystroke service routine block 33 to handle the particular command received. The keystroke command is then processed via channel 34 to text storage buffer manager block 24 which has the capability to control buffer control block 35 to carry out various processes with respect to the data stored in text storage buffer 23.

Figure 3:
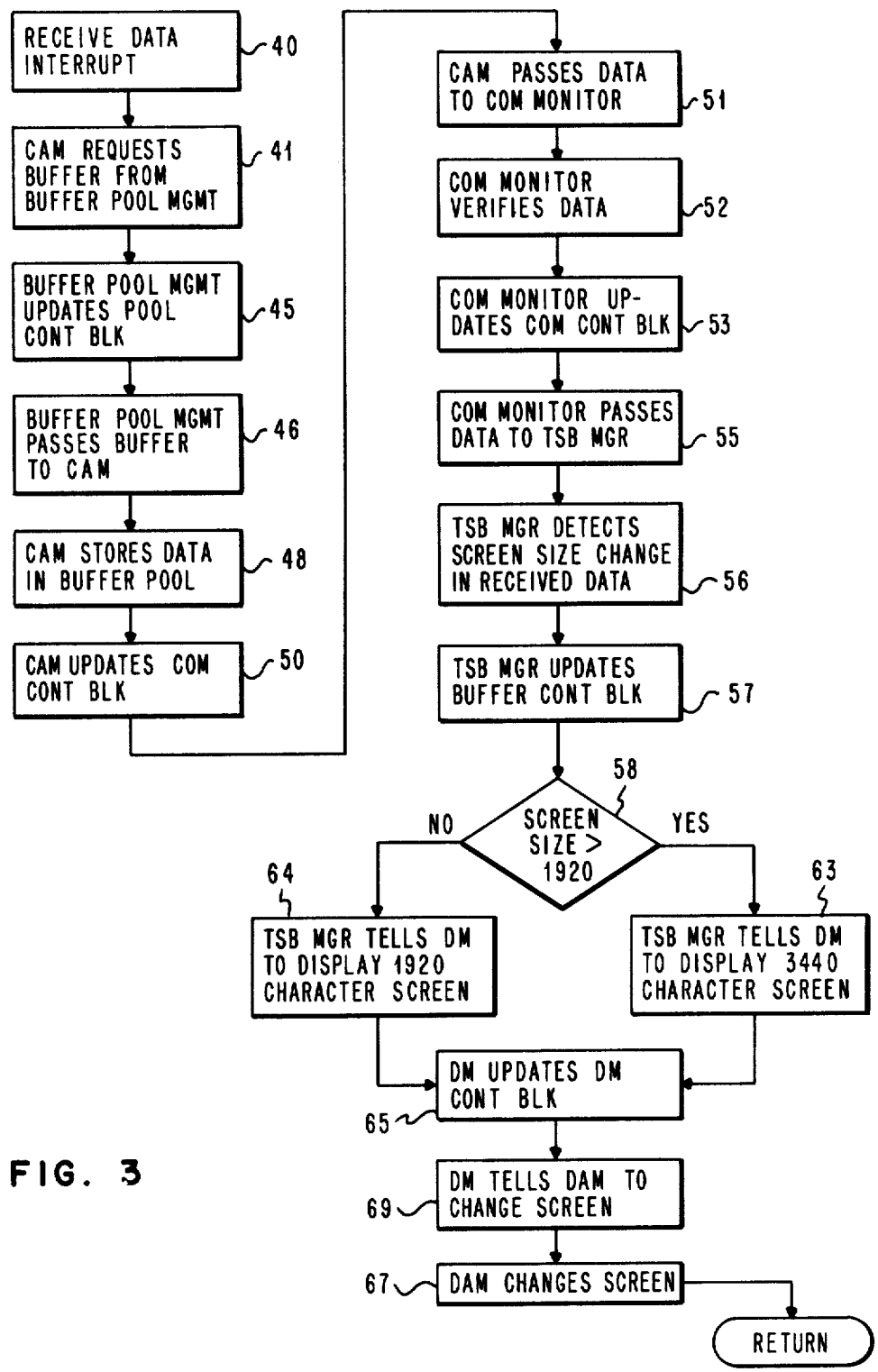
FIG. 3 is a flow chart of the procedure involved in carrying out the present invention.

Now using the logic and memory previously described above with respect to FIGS. 1 and 2, the operations involved in the present invention will be described with respect to the flow chart of FIG. 3. The screen size is determined by the host processor 11. Let us assume that the host processor requires a switch in screen size. First, the data interrupt is received, step 40, FIG. 3. This request comes through the communications adapter in FIG. 1 in the previously described procedure. Communications adapter 14 communicates with memory 19 of FIG. 2 through channel 20 and communicates access method 28. Then, the communications access method requests a buffer from buffer pool management unit 43 in FIG. 3. In response, the buffer pool management updates the buffer pool control block 44, step 45, FIG. 3. Next, step 46, FIG. 3, buffer pool management unit 43 provides a communication access method 28 with a particular buffer designation or address in buffer pool block 47.

At this point, step 48, the communication access method 28 accesses the buffer pool, block 47, over channel 49 and places the data being communicated into the assigned buffer in buffer pool 47.

Now, the communications access method, step 50, updates the communications control block to reflect where in buffer pool 47 the particular data is being stored, i.e., the address. Next, step 51, communications access method passes this address to the communications monitor 30. The communications monitor 30 verifies the data, step 52 by accessing the data in the buffer pool at its address. During this verification, the monitor in effect verifies that the data fits all of the rules of the communication protocol being used. Next, step 53, communications monitor 30 updates the communications control block 54 to indicate that the data has been verified and is valid. Next, the communications monitor 30 passes the data, step 55, to the text storage buffer manager, unit 24. The data passed to text storage buffer manager contains data indicative of the desired screen size. Thus, in step 56, the text storage buffer manager detects the appropriate screen size, i.e., whether there is a screen size change in the received data and, the text storage buffer manager updates the buffer control block 35, step 57, to indicate the appropriate screen size. The screen size is stored in this buffer control block. Next, step 58, a decision is made in the text storage buffer manager as to the appropriate screen size.

Figure 4:
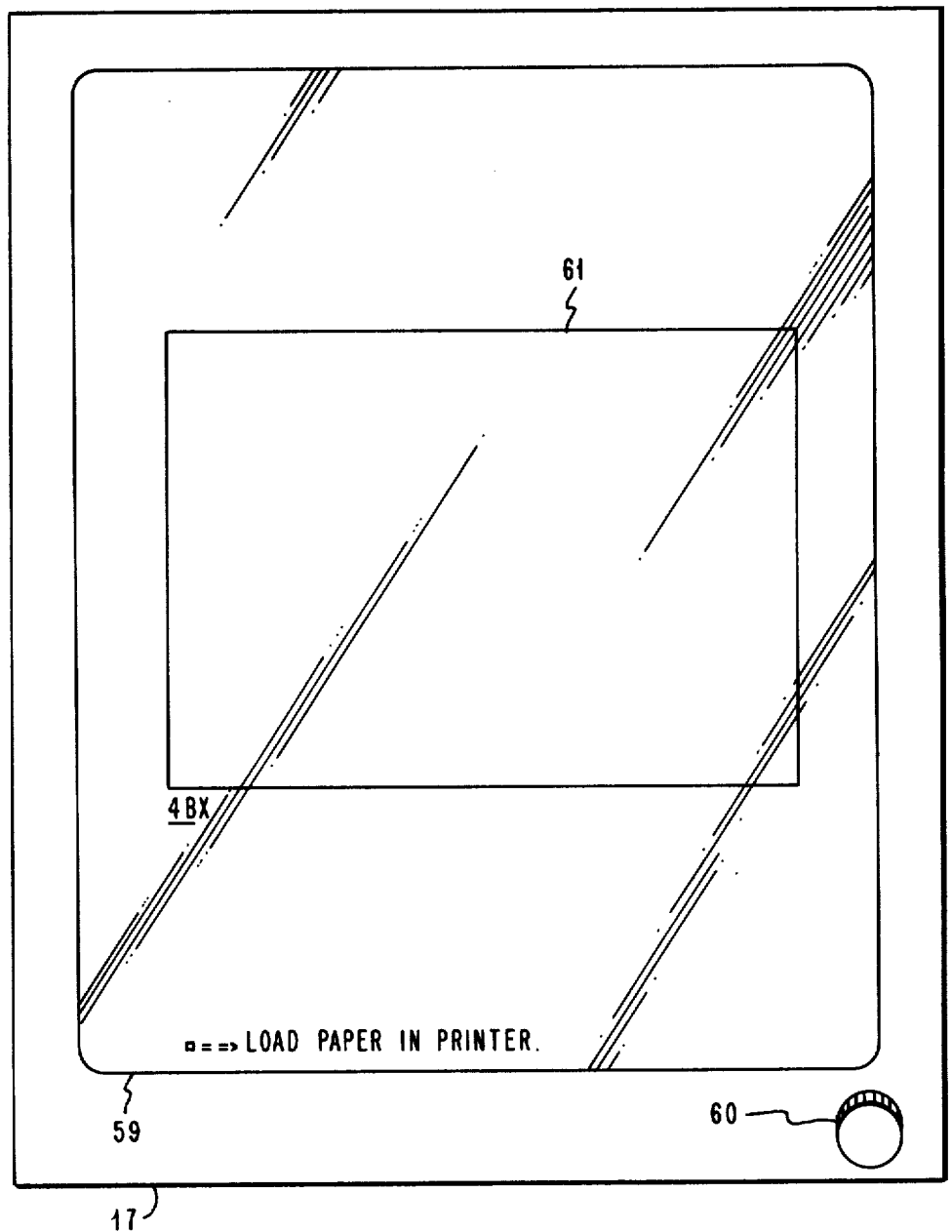
FIG. 4 is a diagrammatic view of a text processor display on which the screen outline of one size data processor display is emulated.
Figure 5:
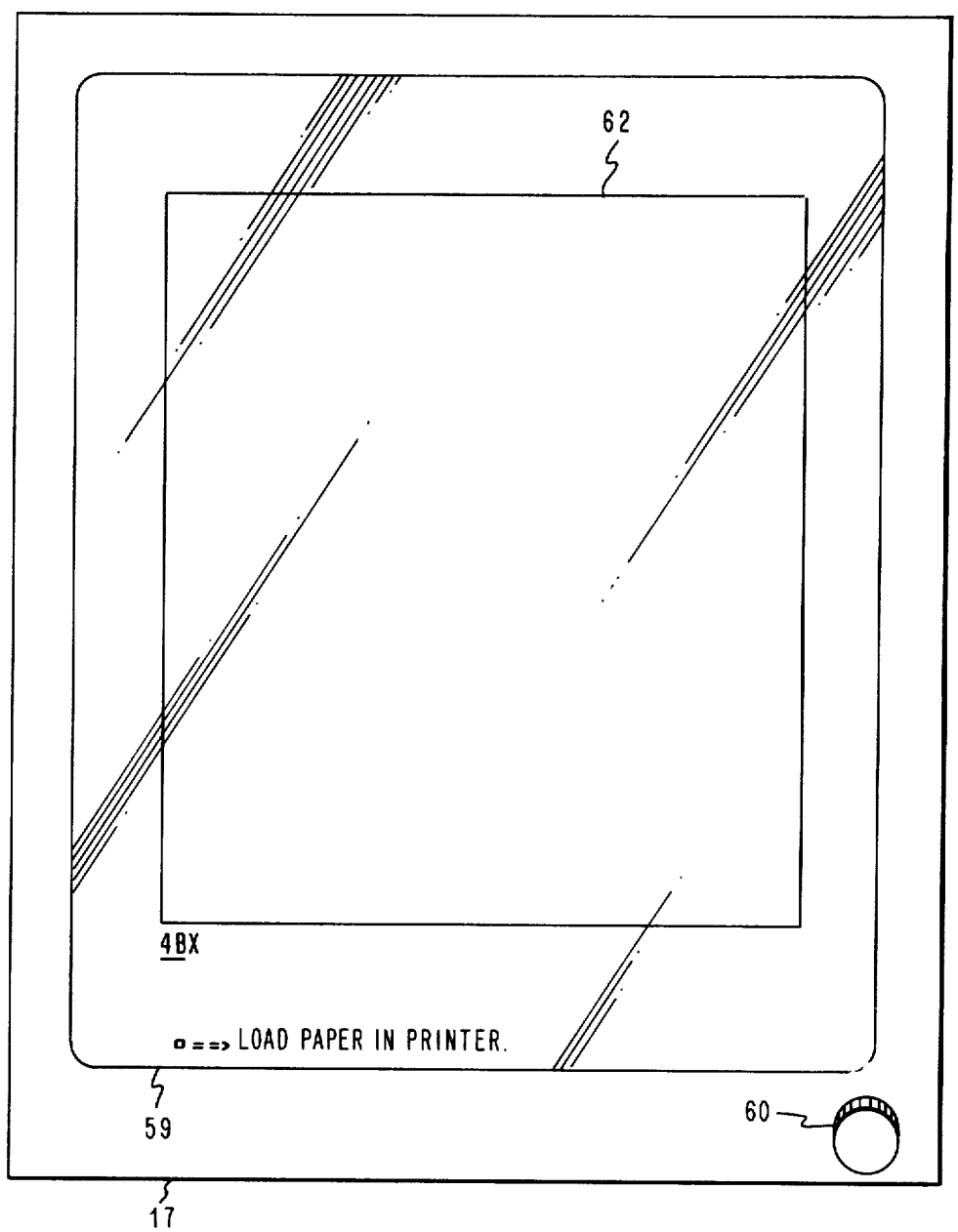
FIG. 5 is a diagrammatic view of the same text processor display on which a data processing screen of a different size is emulated.

At this point before proceeding any further it will be advantageous to illustrate the various screen sizes involved in this embodiment. For convenience in illustration, we have selected a system which may produce data processing terminal screen emulations having two screen sizes which we have illustrated in FIGS. 4 and 5. In FIGS. 4 and 5, we have shown an outline of a display unit 17 which is the display of the text processor. The display unit contains a display CRT screen, the outline of which is shown at 59 and the various operator controls which are represented by dial 60. In FIG. 4 at 61 we have illustrated the outline of a first smaller screen data processing screen size which may be emulated. This screen may contain in the order of about 1920 character spaces. In FIG. 5 we have shown the outline of a larger screen 62 which may be emulated and this may contain in the order of 3440 character spaces.

Getting back to decision block 58, a determination as to which of the two screen sizes is to be emulated is made by deciding whether the screen size is to be greater than 1920 character spaces. If it is, then, step 63, the text storage buffer manager 24 instructs display manager 26 to proceed through the display access method 25 and display refresh buffer 27 to have the screen display the large character screen, i.e., the one that contains 3440 characters which is shown in FIG. 5.

On the other hand, if a decision is made in block 58 that the screen size is not greater than 1920, i.e., the smaller screen size shown in FIG. 4 is to be utilized, then the text storage buffer manager 24 instructs the display manager 26 to display the 1920 character screen. In any event whether step 63 or 64 is followed, the display manager in step 65 updates the display manager control block 68. Then the display manager 26 will request the display access method 25 to change to selected screen size, step 69. The display access method 25 proceeding through the display refresh buffer 27 will have the appropriate screen size utilized, step 67, after which the routine is returned and the data processing session may commence or resume utilizing the appropriate screen size.

While the invention has been particularly shown and described with reference to a preferred embodiment it will be understood by those skilled in the art that various other changes in form and detail may be made without departing from the spirit and scope of the invention.

We claim:

1. In a text processing system having an interactive display terminal and means for conducting text processing sessions involving operations wherein the processing affects only the format of the information, the improvement comprising means for initiating a data processing session wherein said interactive display terminal emulates a data processing terminal, means for interrupting the text processing session being conducted, means for reinitiating the interrupted text processing session at the completion of the data processing session, data processing means connected to said display terminal and operable during said data processing session, and means operative during said data processing session to define outer dimensions of a limited area on the display terminal which are equal to the dimensions of the data processing display terminal being emulated.

2. In a text processing system having an interactive display terminal and means for conducting text processing sessions involving operations within the processing affects only the format of the information, the improvement wherein the system further comprises a data processor for conducting data processing operations, means for initiating a data processing session, means for interrupting the text processing session being conducted, means for reinitiating the interrupted text processing session at the completion of the data processing session, means activated during said data processing session for operating said interactive display terminal as an emulation of a data processing display terminal, means for connecting said emulated display terminal to said data processor, whereby said emulated display terminal functions as a display terminal for said data processor, and means operational during data processing sessions to define outer dimensions of a limited area on the display terminal which are equal to the dimensions of the screen of the data processing display terminal being emulated.

3. The system of claim 2 wherein said means for defining selected outer dimensions of a limited area on the display comprises means in said text processing system for storing data representative of the outline of a plurality of different data processing display screens to be emulated, and means for selecting one of said plurality of stored outlines to be displayed as the emulated screen.

4. The system of claim 3 wherein each of said plurality of outlines has dimensions smaller than the dimensions of the display screen of the said text processing system.

* * * * *

UNITED STATES PATENT AND TRADEMARK OFFICE
CERTIFICATE OF CORRECTION

PATENT NO. : 4,463,442

DATED : 31 July 1984

INVENTOR(S) : R. P. Dachowski and P. D. Motola

It is certified that error appears in the above—identified patent and that said Letters Patent is hereby corrected as shown below:

Col. 6, line 14, delete "within" and substitute --wherein--.

Signed and Sealed this

Twenty-fifth Day of December 1984

[SEAL]

Attest:

*Attesting Officer*

GERALD J. MOSSINGHOFF

*Commissioner of Patents and Trademarks*